US010704767B2

(12) United States Patent
Irgang

(10) Patent No.: US 10,704,767 B2
(45) Date of Patent: Jul. 7, 2020

(54) COLOR MIXING ILLUMINATION DEVICE

(71) Applicant: Rebo Lighting & Electronics, LLC, Ann Arbor, MI (US)

(72) Inventor: Todd Irgang, Saline, MI (US)

(73) Assignee: REBO LIGHTING & ELECTRONICS, LLC, Ann Arbor, MI (US)

( * ) Notice: Subject to any disclaimer, the term of this patent is extended or adjusted under 35 U.S.C. 154(b) by 0 days.

(21) Appl. No.: 16/373,798

(22) Filed: Apr. 3, 2019

(65) Prior Publication Data

US 2019/0309927 A1    Oct. 10, 2019

Related U.S. Application Data

(60) Provisional application No. 62/653,137, filed on Apr. 5, 2018.

(51) Int. Cl.
| | |
|---|---|
| *F21V 13/04* | (2006.01) |
| *F21V 7/24* | (2018.01) |
| *F21V 7/04* | (2006.01) |
| *F21V 5/04* | (2006.01) |
| *F21Y 113/17* | (2016.01) |
| *B60Q 1/50* | (2006.01) |
| *B60Q 1/18* | (2006.01) |
| *F21Y 115/10* | (2016.01) |

(52) U.S. Cl.
CPC ............... *F21V 13/04* (2013.01); *F21V 5/04* (2013.01); *F21V 7/04* (2013.01); *F21V 7/24* (2018.02); *B60Q 1/18* (2013.01); *B60Q 1/50* (2013.01); *B60Q 2400/20* (2013.01); *F21Y 2113/17* (2016.08); *F21Y 2115/10* (2016.08)

(58) Field of Classification Search
CPC .... F21V 13/04; F21V 7/04; F21V 7/24; F21V 5/04
USPC .......................................................... 362/308
See application file for complete search history.

(56) References Cited

U.S. PATENT DOCUMENTS

| | | | | |
|---|---|---|---|---|
| 8,277,062 B2 * | 10/2012 | Potter | .................... | B60K 37/02 362/23.2 |
| 8,826,846 B2 * | 9/2014 | Hori | ....................... | G01D 11/28 116/286 |
| 2005/0128733 A1 * | 6/2005 | Clugston | ................ | G01D 11/28 362/23.16 |
| 2007/0257272 A1 * | 11/2007 | Hutchins | ............. | H01L 25/0753 257/98 |
| 2007/0274096 A1 * | 11/2007 | Chew | ...................... | F21V 31/04 362/609 |
| 2008/0055928 A1 * | 3/2008 | Arai | ..................... | G02B 6/0016 362/609 |

(Continued)

*Primary Examiner* — Bryon T Gyllstrom
(74) *Attorney, Agent, or Firm* — Reising Ethington, P.C.

(57) ABSTRACT

A color mixing illumination device and method of using the same. The color mixing illumination device includes a printed circuit board (PCB) having a PCB surface with a reflective portion; a multi-color light source attached to the PCB, such as a red-green-blue light emitting diode (RGB LED); and a reflector with a reflector surface. The PCB surface and the reflector surface are configured to mix light from the multi-color light source in a mixing region and then direct mixed light out of the device from an exit region. In one embodiment, the color mixing illumination device is a multi-color indicator lamp for a vehicle.

19 Claims, 3 Drawing Sheets

(56) References Cited

U.S. PATENT DOCUMENTS

| | | | |
|---|---|---|---|
| 2009/0166653 A1* | 7/2009 | Weaver, Jr. | H05K 3/28 257/98 |
| 2011/0163334 A1* | 7/2011 | Krijn | F21V 5/007 257/88 |
| 2011/0175527 A1* | 7/2011 | Ramer | H05B 33/0803 315/32 |
| 2012/0230034 A1* | 9/2012 | Boomgaarden | F21V 3/02 362/294 |
| 2013/0088849 A1* | 4/2013 | Lee | F21V 29/713 362/84 |
| 2015/0009649 A1* | 1/2015 | Jagt | H01L 33/507 362/84 |
| 2015/0267896 A1* | 9/2015 | Moon | F21V 7/16 362/310 |

* cited by examiner

COLOR MIXING ILLUMINATION DEVICE

FIELD

The present invention relates generally to color mixing illumination devices, and more particularly, to color mixing illumination devices that can be used for multi-color indicator lamps.

BACKGROUND

With multi-color indicators, light sources such as red-green-blue light emitting diodes (RGB LEDs) are often used. RGB LEDs can be difficult to color mix over short distances, as typically, the physical separation of the red, green, and blue dies or light emitting sites results in different light cones having areas that do not overlap. Generally, a large distance is required to achieve good color uniformity. Additionally, light intensity drops off as light travels further from the center of the LED, and typically follows a Lambertian distribution. Accordingly, the light can appear significantly dimmer at only a short distance from a lit surface of an optic. The presently described color mixing illumination devices can provide good color uniformity in a more compact package, without undesirably impacting the light intensity.

SUMMARY

According to one embodiment, there is provided a color mixing illumination device, comprising: a printed circuit board (PCB) having a PCB surface with a reflective portion; a light source mounted to the PCB and having a first color emitting site and a second color emitting site, wherein the first color emitting site is configured to emit light of a first wavelength and the second color emitting site is configured to emit light of a second wavelength that is different than the first wavelength; a lens; and a reflector having a reflector surface with a first reflective portion, the first reflective portion of the reflector surface faces the reflective portion of the PCB surface to at least partially define a mixing region therebetween, wherein the PCB surface and the reflector surface are configured to mix light from the first color emitting site and the second color emitting site in the mixing region and to direct mixed light to the lens in an exit region.

According to another embodiment, there is provided a color mixing illumination device, comprising: a printed circuit board (PCB) having a PCB surface with a reflective portion; a light source mounted to the PCB, wherein the light source includes a first color emitting site, a second color emitting site, and a third color emitting site, wherein the first color emitting site is configured to emit light of a first wavelength, the second color emitting site is configured to emit light of a second wavelength that is different than the first wavelength, and the third color emitting site is configured to emit light of a third wavelength that is different than the first wavelength and the second wavelength; and a reflector having a first reflective portion and a second reflective portion, wherein the first reflective portion includes a curved wall adjacent the PCB and a transition wall extending to an exit wall at the second reflective portion, wherein the reflector is configured to mix light from the first color emitting site, the second color emitting site, and the third color emitting site between the reflective portion of the PCB and the first reflective portion of the reflector and direct mixed light from the first color emitting site, the second color emitting site, and the third color emitting site at the second reflective portion out through the color mixing illumination device.

According to another embodiment, there is provided a method of using a color mixing illumination device, the color mixing illumination device comprising a printed circuit board (PCB) having a PCB surface with a reflective portion, a light source mounted to the PCB and having a first color emitting site and a second color emitting site, and a reflector having a first reflective portion that faces the reflective portion of the PCB surface to at least partially define a mixing region therebetween. The method comprises the steps of: emitting light of a first wavelength from the first color emitting site; emitting light of a second wavelength from the second color emitting site; mixing light from the first color emitting site and the second color emitting site in the mixing region; and directing mixed light from the mixing region to an exit region.

DRAWINGS

Preferred exemplary embodiments will hereinafter be described in conjunction with the appended drawings, wherein like designations denote like elements, and wherein.

DESCRIPTION

A color mixing illumination device as described herein can effectively mix color from one or more light sources without undesirably impacting the light intensity. The color mixing illumination device can be used, for example, in a multi-color indicator lamp to provide uniform light intensity from one color emitting site or a plurality of color emitting sites. Typically, to achieve adequate color mixing, a relatively large distance is needed. This may be difficult to achieve in smaller applications (e.g., less than 25 mm), such as with smaller indicator lights used in vehicles or other applications. The color mixing illumination device described herein can achieve more uniform color mixing in such smaller applications by using various reflective optical surfaces with respect to one or more light sources.

Figure 1:
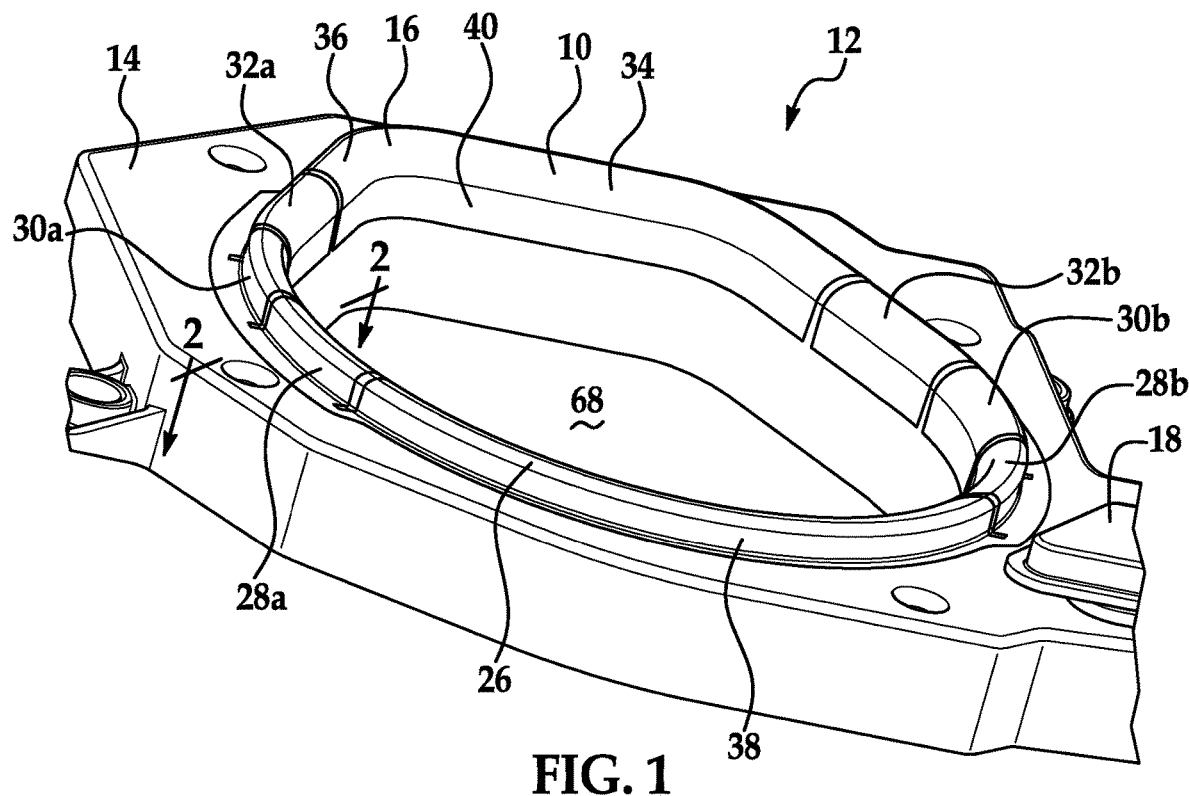
FIG. 1 is a perspective view of a multi-color indicator lamp having a color mixing illumination device in accordance with one embodiment.

FIG. 1 is a perspective view of a color mixing illumination device 10 for a multi-color indicator lamp 12. The illustrated embodiment is a multi-color indicator lamp 12 for an exterior vehicle charging port, although other vehicle-based or non-vehicle-based applications for the color mixing illumination device are certainly possible. For example, the color mixing illumination device 10 could be used in an ambient lighting application, a headlight liner or halo, or in any other implementation where it is desirable to mix light from one or more light sources, such as a red-green-blue light emitting diode (RGB LED). The color mixing illumination device 10 can be particularly well-suited for smaller scale applications (e.g., when a thickness of the device or lamp is about 25 mm or less), as it is able to effectively mix color despite the compact nature of the optical surfaces with respect to each other.

The multi-color indicator lamp 12 includes a housing 14 that generally supports or otherwise contains various components of the color mixing illumination device 10, such as a lens 16 and an additional indicator light 18. The housing 14 is generally opaque to cover the various internal components of the color mixing illumination device 10, which are detailed further below. The housing 14 and color mixing illumination device 10 are shown as generally annular components. However, it is possible to have other shapes for the housing 14 and color mixing illumination device 10 (e.g., linear), depending on the desired implementation of the multi-color indicator lamp 12.

Figure 2:
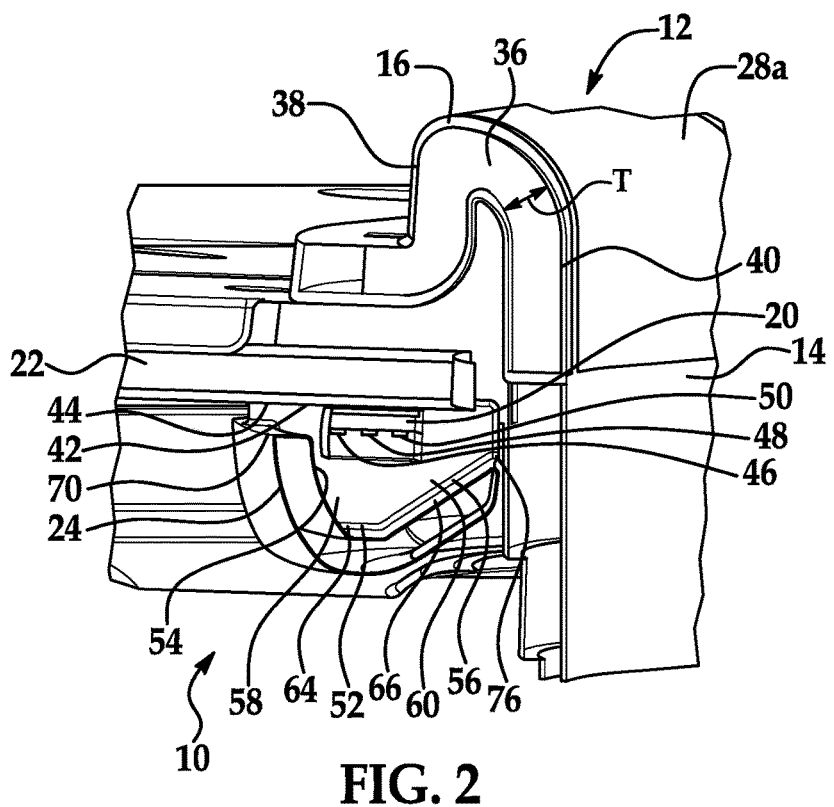
FIG. 2 is a cross-section view of the multi-color indicator lamp and color mixing illumination device of FIG. 1, taken along line 2-2 in FIG. 1.

With reference to FIG. 1 and the cross-section view in FIG. 2, the color mixing illumination device 10 generally comprises the lens 16, a light source 20, a printed circuit board (PCB) 22, and a reflector 24. The light source 20 is preferably an RGB LED, or in this embodiment, a plurality of RGB LEDs, which allow for different color variations for the multi-color indicator lamp 12. In the illustrated embodiment, the multi-color indicator lamp 12 is a charging port indicator in an electric vehicle, such as the type that surrounds an electric charging port or outlet on an electric or hybrid vehicle so as to indicate its location, mode, and/or status to a user. The color mixing illumination device 10 of the multi-color indicator lamp 12 has a number of arcuate illumination segments 26, 28a, 28b, 30a, 30b, 32a, 32b, 34. In this embodiment, the illumination segments 26, 28a, 28b, 30a, 30b, 32a, 32b, 34 are portions of the lens 16 that are delimited by opaque portions of the housing 14. Dividing the color mixing illumination device 10 into a number of illumination segments may be desirable in implementations where the color mixing illumination device is used to indicate a number of levels, stages, etc., or if the color mixing illumination device is used in an application where it is desirable to selectively illuminate one or more portions of the overall lamp assembly 12. In the illustrated embodiment, the illumination segments 26, 28a, 28b, 30a, 30b, 32a, 32b, 34 may progressively illuminate or cycle to indicate that the vehicle is charging while plugged in. For example, illumination segment 26 may be illuminated, then segments 28a and 28b, then segments 30a and 30b, then segments 32a and 32b, then segment 34, which then all may be turned off and the cycle can begin again. In another example, all of the illumination segments 26, 28a, 28b, 30a, 30b, 32a, 32b, 34 may remain lit to indicate a full charge. Different colors may be used to indicate different charging modes (e.g., blue indicates a normal charge, green indicates a slower or value charge, red indicates a very low charge or an error with the plug and/or charging mechanism, white indicates that the vehicle is fully charged or just illuminates the socket in general, etc.). It should be understood that while the description is focused on this one particular application, the color mixing illumination device 10 can be used in various other applications having alternate configurations, designs, etc. Other modes of operation are certainly possible as well.

Light from one or more light sources 20 is emitted through the lens 16 of the color mixing illumination device 10. The lens 16 of the color mixing illumination device 10 may be a co-molded component that is integrated with the housing 14, as shown, or it may be a separate element. In one embodiment, the lens 16 is a highly diffusive lens which can help promote a more homogenous distribution of light, particularly when multiple light sources 20 are used. Various features of the lens 16 may help to diffuse light uniformly and efficiently. For example, the lens 16 may include a curved apex 36 between two generally planar side walls 38, 40 which extend up and away from the other components of the color mixing illumination device 10. The lens 16 may be made from any operable transparent or translucent material, such as a clear-grade acrylonitrile butadiene styrene (ABS), polycarbonate (PC), poly(methyl methacrylate) (PMMA), etc. In one embodiment, the lens 16 should have a sufficient thickness and/or translucence to scatter and homogenize the light, and it is desirable from an aesthetic perspective to hide the interior components of the color mixing illumination device 10. Certain areas of the lens 16 may have a decreased thickness T than other areas of the lens to selectively promote greater illumination in particular regions.

Figure 3:
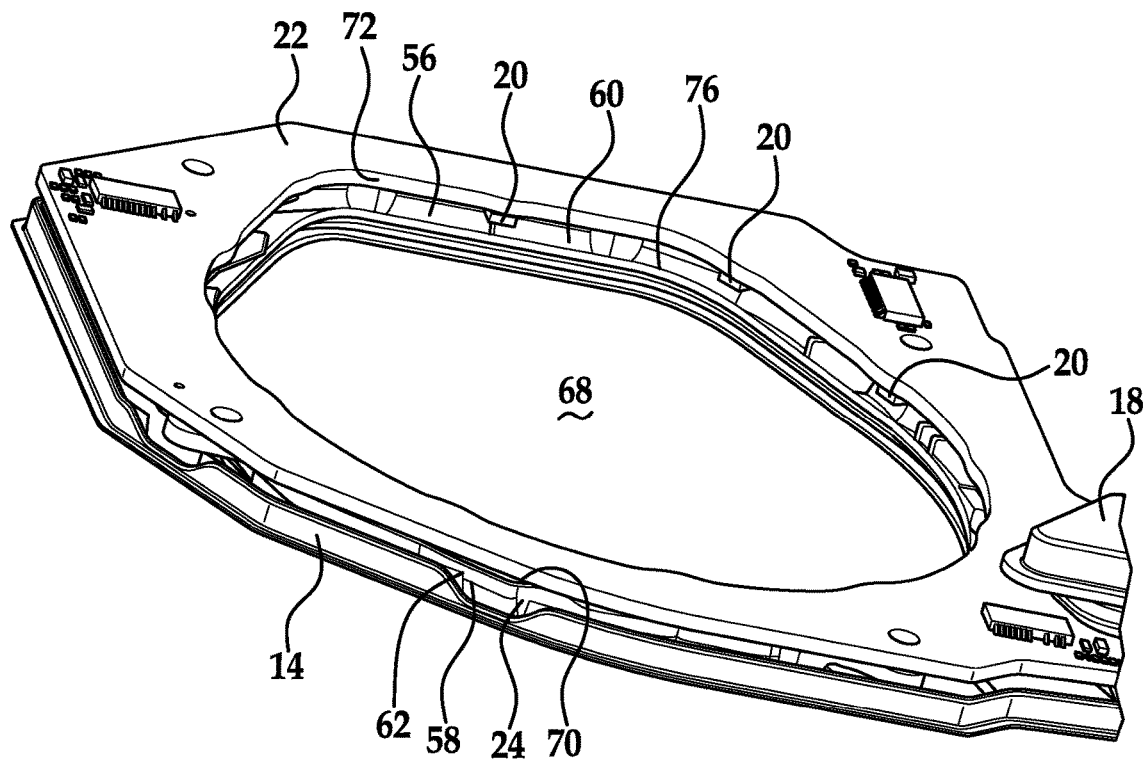
FIG. 3 is a perspective view of a printed circuit board (PCB) of the color mixing illumination device of FIG. 1.
Figure 4:
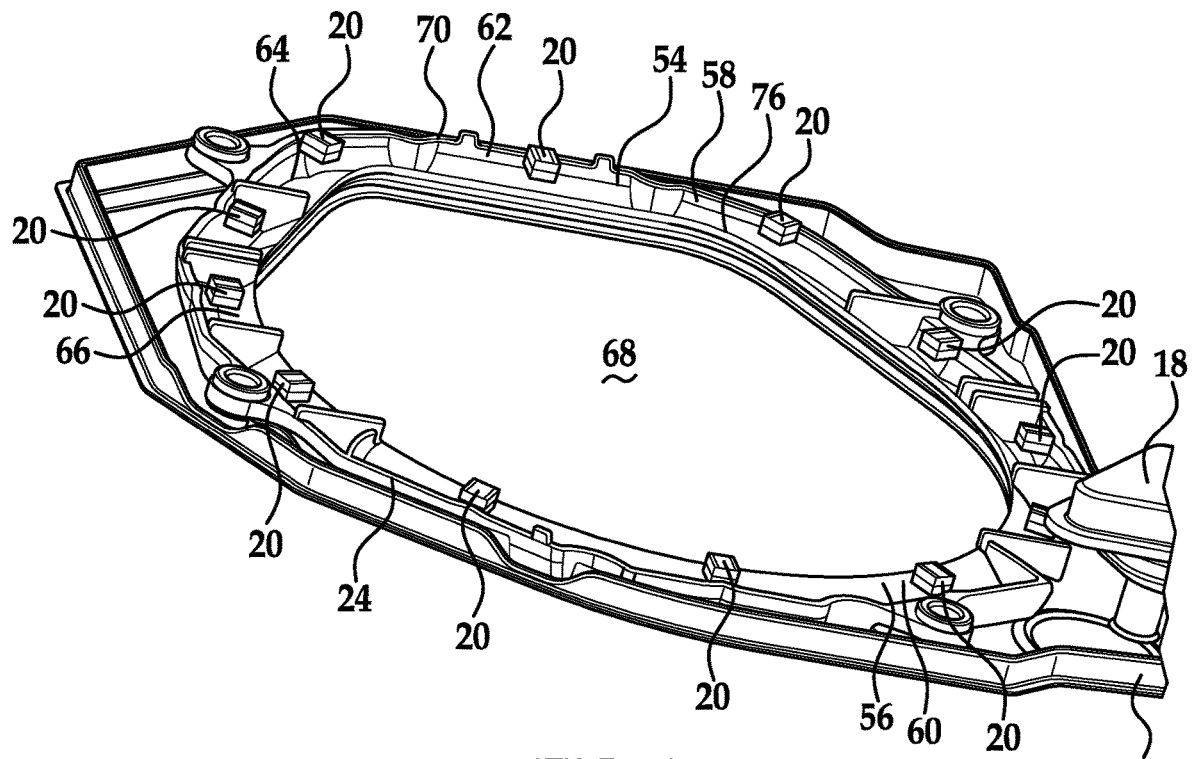
FIG. 4 is a perspective view of a reflector and light sources of the color mixing illumination device of FIG. 1.
Figure 5:
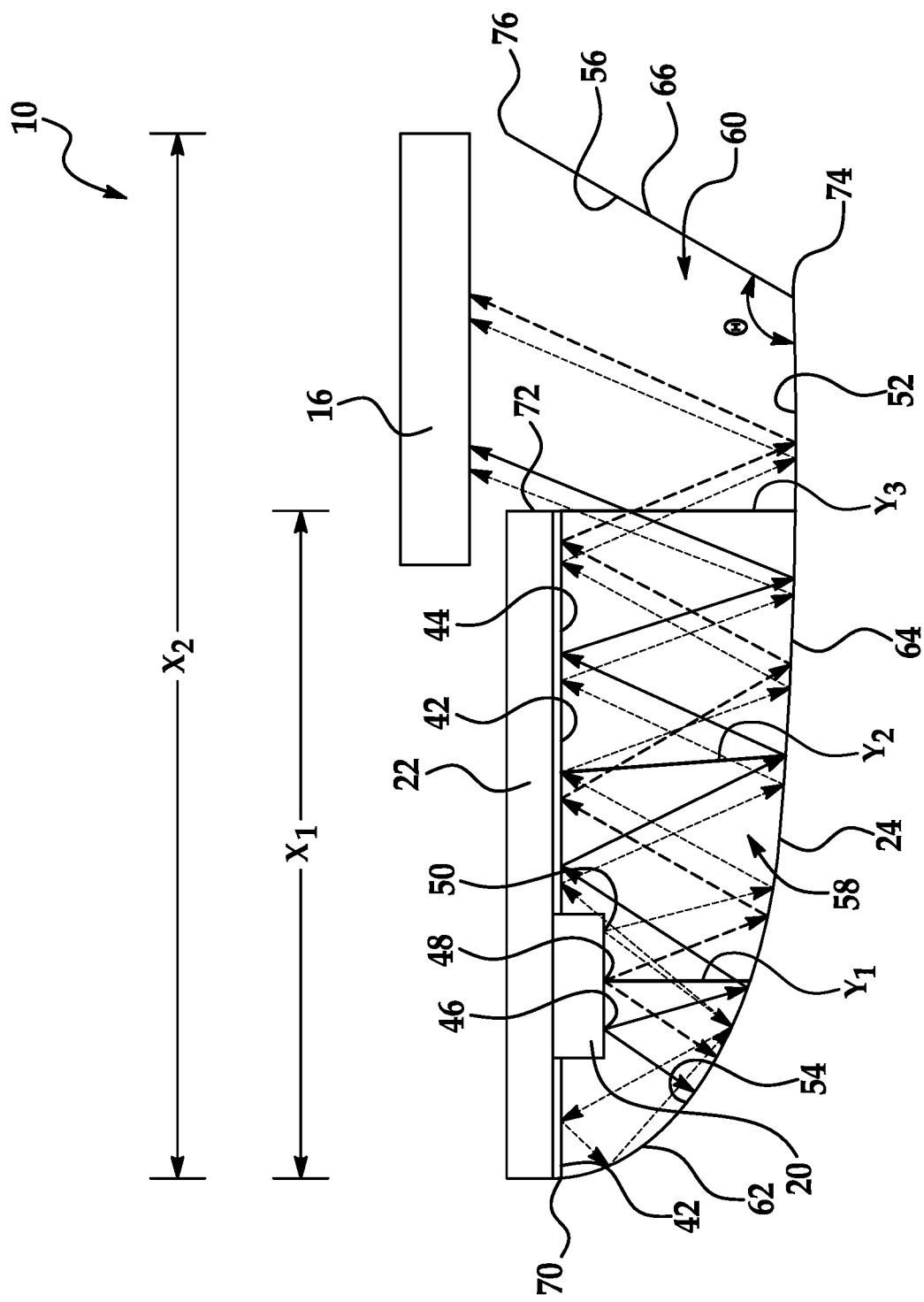
FIG. 5 is a simplified schematic cross-sectional view of a color mixing illumination device according to one embodiment.

FIG. 3 is a partial view of the color mixing illumination device 10 of FIGS. 1 and 2 with the lens 16 removed to show the PCB 22 and part of the reflector 24. FIG. 4 provides a view of the light sources 20 and the reflector 24 with both the lens 16 and the PCB 22 removed. FIG. 5 provides a schematic, cross section view of the various components of the color mixing illumination device 10. With reference to FIGS. 2, 3, and 5, the PCB 22 generally opposes the reflector 24 and provides for the various control circuitry for the light sources 20. In the color mixing illumination device 10, the PCB 22 is used as an optical surface or component itself, in that it is designed to reflect light or otherwise impact the light path, as opposed to merely carrying electronic circuit components. Using the PCB 22 as an optical surface can result in a more compact device that can more efficiently mix color from various light sources. Efficiency may also be improved by providing a metallized PCB 22. In the illustrated embodiment, the PCB 22 is a diffuse-reflective PCB. Using a diffuse-reflective PCB 22 makes the PCB part of the reflective system. One way this may be accomplished is through the use of a reflective portion 42, which in this embodiment, is a reflective solder mask. In one particular example, a Bergquist StabiLUX™ reflective solder mask 42 is used to provide a white reflective portion on a surface 44 of the PCB 22 to enhance color mixing. In this example, the PCB 22 is highly diffusive. As used herein, a surface that is "highly diffusive" is a surface where about 95% or more of the light that impacts the surface is subject to diffusive reflection. Other diffusive features (e.g., stippling, notches, etc.) could be added to the reflective portion 42 of the PCB 22 to help promote diffusion. In the illustrated embodiment, use of a highly diffusive, reflective portion or solder mask improves color mixing.

FIG. 4 shows the light sources 20 with respect to the reflector 24 with the PCB 22 removed (normally, the light sources would be mounted on the PCB). This embodiment of the color mixing illumination device 10 includes twelve light sources 20. More or less light sources 20 are certainly possible and will vary depending on the desired configuration of the color mixing illumination device 10 and/or the multi-color indicator lamp 12. Each light source 20 is an RGB LED in this embodiment, although other types of light sources are certainly possible. For example, it is possible to have separate mono-chromatic light sources 20 that are mounted on PCB 22. In the illustrated embodiment, with reference to FIG. 5, the RGB LED light source 20 includes a first color emitting site 46, a second color emitting site 48, and a third color emitting site 50. The first color emitting site 46 is configured to emit light of a first wavelength (e.g., red light). The second color emitting site 48 is configured to emit light of a second wavelength (e.g., green light). The third color emitting site 50 is configured to emit light of a third wavelength (e.g., blue light). While FIG. 5 illustrates that the light emitting sites 46, 48, 50 appear to be coplanar in two planes, in the implementation of FIGS. 1-4, the light emitting sites 46, 48, 50 are coplanar in only one plane.

Colored light that is emitted from the light sources 20 is mixed between the reflector 24 and the PCB 22. The reflector 24 and the PCB 22 accordingly create a reflective system that mixes color from two or more light emitting sites 44, 46, 48. In the illustrated embodiments, the reflector 24 is a diffuse-reflective reflector, and in some embodiments, is highly reflective. In one particular embodiment, the reflector 24 is made from a white diffusive PC, such as Covestro Makrolon™ RW2407-010226, although any other operable material could be used, such as ABS to cite one additional example. Efficiency may also be improved by providing a metallized reflector 24. The reflector 24 and the PCB 22 may combine to create an effect similar to an integrating sphere to provide uniform color-mixing. Other diffusive features (e.g., stippling, notches, etc.) could be added to the reflector 24 to help promote diffusion.

The reflector 24 can include a number of structural features to enhance the color mixing performance of the color mixing illumination device 10. With reference to FIGS. 2, 4, and 5, the reflector includes an interior surface 52 which generally opposes or faces the surface 44 of the PCB 22 having the reflective portion 42. The interior surface 52 includes a first reflective portion 54 and a second reflective portion 56. The first reflective portion 54 of the reflector surface 52 faces the reflective portion 42 of the PCB 22 to at least partially define a mixing region 58 therebetween. The second reflective portion 56 of the reflector surface 52 faces the lens 16 to at least partially define an exit region 60 therebetween. Accordingly, light emitted from two or more of the color emitting sites 46, 48, 50 of the light source 20 can be mixed via multiple reflections in the mixing region 58 and then mixed light can exit through the exit region 60 and lens 16.

According to one embodiment, the first reflective portion 54 of the reflector 24 is bowl-shaped and includes a curved wall 62 adjacent the PCB 22 and a transition wall 64 that extends to an exit wall 66 at the second reflective portion 56. Given the annular configuration of the color mixing illumination device 10, the bowl-shaped first reflective portion 54 has a sort of semi-toroidal configuration that generally follows the shape of the annulus 68. This configuration is particular to annular embodiments, as it is also possible to have more linear-shaped or other shaped color mixing illumination devices that do not have the semi-toroidal-like configuration. The curved wall 62 is preferably located between an edge 70 of the reflector 24 and the light source 20, such that the transition wall 64 opposes the light source 20. Having the curved wall 62 behind the light source 20 can help encourage light to bounce toward the exit region 60.

The transition wall 64 generally spans from the first reflective portion 54 to the second reflective portion 56, the second reflective portion 56 being generally located so as to oppose the lens 16. In some embodiments, the transition wall 64 is sloped such that one or more of the distances Y1, Y2, and Y3 are different. In the illustrated embodiment, the distance Y1 is from the center of the light source 20 to the transition wall 64 and is approximately 3 mm. The distance Y2 is from the center of the PCB 22 to the transition wall 64 and is approximately 4.5 mm. The distance Y3 is from an edge 72 of the PCB 22 to the transition wall 64 and is approximately 4.5 mm. Accordingly, a majority of the depth variation in the sloped transition wall is between Y1 and Y2, whereas between Y2 and Y3, there is a negligible amount of depth variation. Keeping a more consistent depth between Y2 and Y3 may help abate intensity losses. The color uniformity can improve with more reflections and/or larger distances between the light source 20 and the reflector 24, but such uniformity should be balanced with intensity, as the intensity drops correspondingly with larger distances for Y1, Y2, and/or Y3. Preferably, the distance of Y1, Y2, and/or Y3 is in a range of about 2 mm to about 25 mm, inclusive.

The second reflective portion 56 is generally defined as the portion of the transition wall 64 that opposes the lens 16 at the exit region 60 and the exit wall 66. The junction 74 between the transition wall 64 and the exit wall 66 is preferably angled to help encourage light transmission out through the lens 16. The angle θ is preferably between about 110° and 160°, inclusive, and more particularly is about 135° in the illustrated embodiment. Angles between about 110° and 160°, can help promote transmission from the mixing region 58 out of the exit region 60. Accordingly, the first reflective portion 54 spans the length of the reflector 24 from the PCB edge 72 to the junction 74, and the second reflective portion spans the length of the reflector 24 from the junction 74 to an edge 76.

In the mixing region 58, a number of reflections from light emitted from the RGB LED light source 20 can provide for adequate color mixing and an additive color system that is less pixelated and maintains a desirable intensity. This color mixing is schematically illustrated in FIG. 5 and has been validated with ray tracing. The mixing region 58 is generally defined as the region between the PCB 22 and the reflector 24, and can have a width X1 in which multiple colors of light can mix, as illustrated. The width X2 generally corresponds to the width of the mixing region 58 and the exit region 60 together, or in some embodiments, the maximum width of the reflector 24. In the illustrated embodiment, X1 is about 8 mm and X2 is about 14 mm. Increasing either X1 or the dimension X2-X1 (i.e., the opening to the lens 16 between the PCB edge 72 and the edge 76 of the reflector) may allow for the use of a less diffusive or more transmissive lens, and accordingly, these dimensions may be varied depending on the desired optical performance. However, the intensity decreases with increasing numbers of reflections between the reflector 24 and the PCB 42, so the distance X1 should not be so great as to substantiate significant losses in the system.

In one embodiment, a method of using the multi-color indicator lamp 12 having the color mixing illumination device 10 includes illuminating at least two color emitting sites 46, 48, 50 (e.g., red and blue). Emitted light is then mixed in the mixing region 58 by reflecting one or more times between the first reflective portion 54 of the reflector 24 and the reflective portion 42 of the PCB 22. The first reflective portion 54 may be configured such that emitted light is encouraged toward the exit region 60. Accordingly, after multiple reflections in the mixing region 58, mixed light (e.g., purple) can then exit through the exit region 60 through the lens 16. The exit region 60 may also be configured to encourage emitted light toward the lens 16.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A color mixing illumination device, comprising:
a printed circuit board (PCB) having a PCB surface with a reflective portion;
a light source mounted to the PCB and having a first color emitting site and a second color emitting site, wherein the first color emitting site is configured to emit light of a first wavelength and the second color emitting site is configured to emit light of a second wavelength that is different than the first wavelength;
a lens; and
a reflector having a reflector surface with a first reflective portion, a second reflective portion, and a junction separating the first and second reflective portions, the first reflective portion of the reflector surface faces the reflective portion of the PCB surface to at least partially define a mixing region therebetween, the second reflective portion of the reflector surface faces the lens to at least partially define an exit region therebetween, wherein the PCB surface and the reflector surface are configured to mix light from the first color emitting site and the second color emitting site in the mixing region and to direct mixed light to the lens in the exit region.

2. The color mixing illumination device of claim 1, wherein the light source is a red-green-blue light emitting diode (RGB LED) and further comprises a third color emitting site that is configured to emit light of a third wavelength that is different than the first wavelength and the second wavelength, wherein the first color emitting site is a red emitting site, the second color emitting site is a blue emitting site, and the third color emitting site is a green emitting site.

3. The color mixing illumination device of claim 2, wherein the reflector is configured to mix light from the first color emitting site, the second color emitting site, and the third color emitting site at the mixing region and direct mixed light from the first color emitting site, the second color emitting site, and the third color emitting site at the exit region out through the lens.

4. The color mixing illumination device of claim 1, wherein the reflective portion of the printed circuit board (PCB) includes a reflective solder mask.

5. The color mixing illumination device of claim 1, wherein the reflector is made from a white diffusive plastic material.

6. The color mixing illumination device of claim 1, wherein the first reflective portion of the reflector is bowl-shaped and the second reflective portion of the reflector is angled.

7. The color mixing illumination device of claim 6, wherein the bowl-shaped first reflective portion has a semi-toroidal configuration that follows a shape of an annulus located toward a center of the color mixing illumination device.

8. The color mixing illumination device of claim 6, wherein the first reflective portion of the reflector includes a curved wall adjacent the printed circuit board (PCB) and a transition wall extending to an exit wall at the second reflective portion of the reflector.

9. The color mixing illumination device of claim 8, wherein the angle between the exit wall and the sloped transition wall is between about 110° and 160°, inclusive.

10. The color mixing illumination device of claim 9, wherein the angle between the exit wall and the sloped transition wall is about 135°.

11. The color mixing illumination device of claim 1, wherein a distance between the reflector and the printed circuit board (PCB) in a range of about 2 mm to about 25 mm, inclusive.

12. The color mixing illumination device of claim 1, wherein the lens includes a curved apex between two planar side walls.

13. A multi-color indicator lamp for a vehicle comprising the color mixing illumination device of claim 1.

14. The multi-color indicator lamp of claim 13, comprising a plurality of illumination segments configured to progressively illuminate in a cycle.

15. A color mixing illumination device, comprising:
a printed circuit board (PCB) having a PCB surface with a reflective portion;
a light source mounted to the PCB, wherein the light source includes a first color emitting site, a second color emitting site, and a third color emitting site, wherein the first color emitting site is configured to emit light of a first wavelength, the second color emitting site is configured to emit light of a second wavelength that is different than the first wavelength, and the third color emitting site is configured to emit light of a third wavelength that is different than the first wavelength and the second wavelength; and
a reflector having a first reflective portion and a second reflective portion, wherein the first reflective portion includes a curved wall adjacent the PCB and a transition wall extending to an exit wall at the second reflective portion, wherein the reflector is configured to mix light from the first color emitting site, the second color emitting site, and the third color emitting site between the reflective portion of the PCB and at least one of the curved wall or the transition wall of the reflector and to direct at least some of the mixed light from the first color emitting site, the second color emitting site, and the third color emitting site to the exit wall so that the mixed light exits out through the color mixing illumination device.

16. The color mixing illumination device of claim 15, further comprising a lens having two planar sidewalls that at least partially extend orthogonally away the reflector and join at a curved apex.

17. A multi-color indicator lamp for a vehicle comprising the color mixing illumination device of claim 15.

18. A method of using a color mixing illumination device, the color mixing illumination device comprising a printed circuit board (PCB) having a PCB surface with a reflective portion, a light source mounted to the PCB and having a first color emitting site and a second color emitting site, and a reflector having a first reflective portion, a second reflective portion, and a junction separating the first and second reflective portions, the first reflective portion faces the reflective portion of the PCB surface to at least partially define a mixing region therebetween, the second reflective portion faces the lens to at least partially define an exit region therebetween, the method comprising the steps of:
- emitting light of a first wavelength from the first color emitting site;
- emitting light of a second wavelength from the second color emitting site;
- mixing light from the first color emitting site and the second color emitting site in the mixing region; and
- directing mixed light from the mixing region to the exit region.

19. The method of claim 18, wherein the color mixing illumination device includes a plurality of illumination segments, each illumination segment having a light source, and further comprising the step of progressively illuminating each of the plurality of illumination segments in a cycle.

* * * * *